(No Model.)
W. HAHN.
DENTAL ENGINE DRIVING HEAD.
No. 551,763. Patented Dec. 24, 1895.
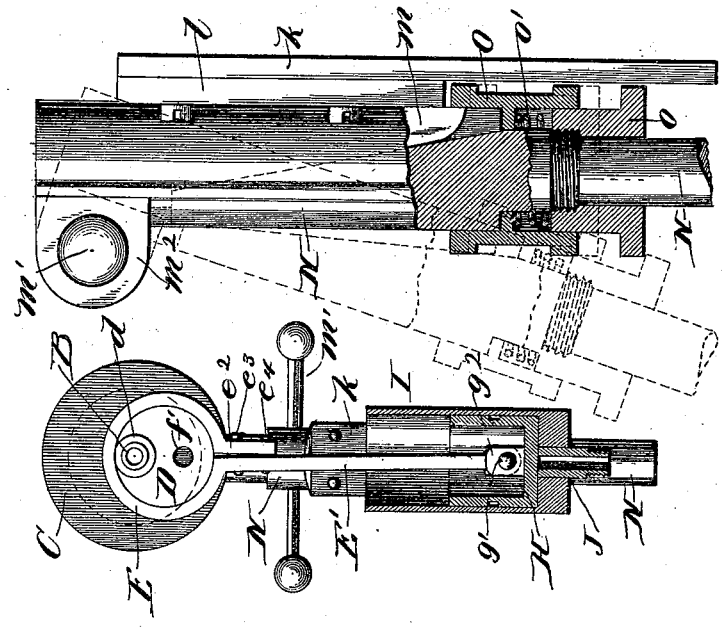
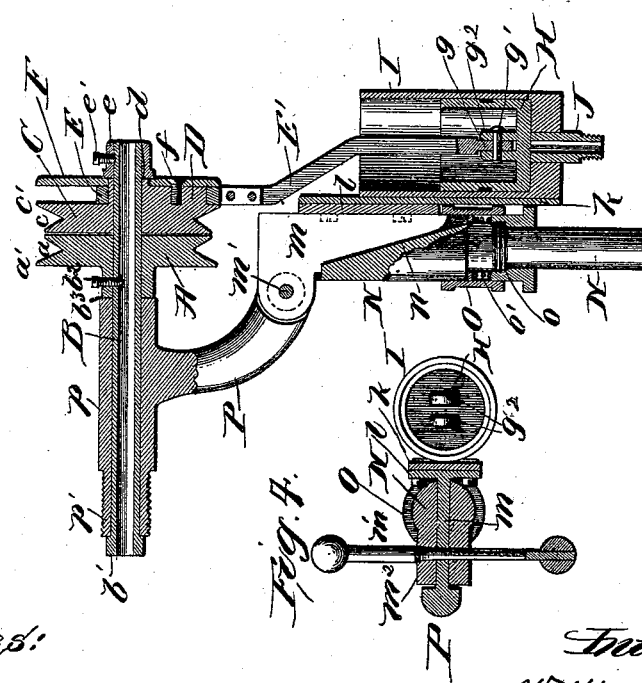
Witnesses:
Inventor
William Hahn

UNITED STATES PATENT OFFICE.

WILLIAM HAHN, OF CHICAGO, ILLINOIS, ASSIGNOR TO BYRON S. PALMER, OF SAME PLACE.

DENTAL-ENGINE DRIVING-HEAD.

SPECIFICATION forming part of Letters Patent No. 551,763, dated December 24, 1895.

Application filed January 12, 1893. Serial No. 458,174. (No model.)

*To all whom it may concern:*

Be it known that I, WILLIAM HAHN, a citizen of the United States, residing at Chicago, in the county of Cook and State of Illinois, have invented certain new and useful Improvements in Driving-Heads for Dental Engines; and I do hereby declare that the following is a full, clear, and exact description of the invention, which will enable others skilled in the art to which it pertains to make and use the same, reference being had to the accompanying drawings, forming a part hereof, in which—

Figure 1 is a longitudinal section showing a head adapted for use with a White engine. Fig. 2 is a face view with the outer plate of the head removed, showing the eccentric, and with the pump-cylinder and piston in section. Fig. 3 is a side elevation, partly in section, showing the standard for attaching the head to the frame or standard of a White engine, and showing in dotted lines the position of the parts when the head is thrown down. Fig. 4 is a cross-section showing the attachment of the pump-cylinder to the arm or standard of the head.

The object of this invention is to provide an improved driving-head having novel means for connection to a dental engine.

To this end the invention consists in the novel construction and combination of parts hereinafter described and claimed.

In the drawings, A represents a pulley for revolving the tool-shaft, which shaft can be of any usual and well-known form of construction, such as used on the White engine. This pulley has a groove $a$ in its periphery for the driving-belt, and, as shown in Fig. 1, the outer flange $a'$ of the groove $a$ is of a greater diameter than the inner flange, and forms a guard to prevent the belt, when transferred, from slipping off the pulley A.

B is a sleeve carrying the pulley A, which is secured thereto by a set-screw $b^2$ passing through the hub $b^3$ on the pulley A, as shown in Fig. 1. The inner end of the sleeve B has a head $b'$ forming a shoulder to abut against the box or bearing for the tool-shaft of a White engine. The sleeve B forms a part of the pulley A and revolves with such pulley.

C is a pulley having a groove $c$ for the driving-belt of the engine, the outer flange $c'$ of which is of a larger diameter than the inner flange, said flange $c'$ holding the driving-belt against slipping off from the pulley C when transferred thereto from the pulley A, and it will be noticed that the inner flanges of both pulleys A and C for the belt-grooves $a$ and $c$ are equal in diameter, which enables the driving-belt to be readily transferred from one pulley to the other, and, in transferring, the outer flanges $a'$ and $c'$ of the pulleys A and C hold the driving-belt against slipping off the pulleys. The pulley C is loosely mounted on the sleeve B of the pulley A, so as to revolve on the sleeve B without transmitting rotation to the pulley A, and at the same time the pulley A is free to revolve and rotate the sleeve B without revolving the pulley C, the result being that either pulley can be used without driving the other pulley, thereby enabling either the tool-shaft or the pump to be actuated independent one of the other.

D is a disk having an annular periphery and set eccentric to the center of the pulley C, and this disk D can be formed with the pulley C, or by an independent piece screwed or otherwise firmly secured to the pulley C. This disk D around the opening therein for the passage of the sleeve B has a hub or annular flange $d$, which gives an increased bearing for the pulley C on the sleeve B.

E is a ring encircling the eccentric disk D and having a stem $E'$ for attachment to the stem of the pump-piston, as shown. This ring E is open on one side, as shown in Fig. 2, with a piece or end $e^2$ through which and into the stem $E'$ a screw $e^3$ passes, by means of which screw the wear on the eccentric disk D and the ring E can be taken up or compensated for, and the piece or end $e^2$ is held against side spring by a pin $e^4$ projecting out from the stem $E'$.

F is a plate or disk for holding the ring E in place on the eccentric disk D, which plate F fits over the hub or center $d$ of the eccentric disk D, and is held in place by a screw $f$, which enters a hole $f'$ in the eccentric disk D. The pulley C, with the eccentric D and ring E, and the plate F, is held against end thrust or movement on the sleeve B by a collar e fitting over the end of the sleeve B and abutting against the plate F and locked to the sleeve B by a set-screw $e'$, as shown in Fig. 1.

H represents the piston which is connected to the stem $E'$ by means of a pin $g'$ passing through an ear $g$ on the lower end of the stem or ears $g^2$ formed on the piston H.

I is the pump-cylinder in which the piston H is located and operates, and J is a tube or nozzle extending from the pump-cylinder I and having communication with the interior of such cylinder and also having suitable communication (not shown) with a pneumatic hammer, as usual.

N is a post having one end formed to enter the standard or frame of a White engine by removing the head of such engine. This post N has a slot or recess $n$, which receives a plate or ear $m$ on a plate $l$, which plate is screwed or otherwise firmly secured to a plate $k$ attached to the pump-cylinder I, and the ear or plate $m$ is pivoted by a suitable pin or pivot $m'$ between ears $m^2$ on the post N, as shown in Figs. 1, 3 and 4.

O is a sliding ring or band encircling the post N, and having a nut $o$, and the body of the nut $o$ screw-threads onto the post N, and between the end of the nut $o$, and the wall or face on the interior of the ring or band O is a coil-spring $o'$, by which the band or ring is held in its normal position, and so as to engage the tip end of the plate or ear $m$ and lock the ear or plate against turning out from the post N until the ring or band O is withdrawn from its normal position to clear the tip end of the plate or ear $m$.

P is an arm having the plate or ear $m$ formed therewith, and having at its end a sleeve or bearing $p$, in which is mounted the sleeve B, and the sleeve or bearing $p$ has a screw-threaded end $p'$ for the attachment of the tool-shaft of a White engine, as usual. The pump-cylinder I and the head are connected to the post N through the arm P and the ear or plate $m$, and as the ear or plate $m$ is attached by the pin or pivot $m'$ the pump-cylinder with the head can be turned or thrown out of normal position for any purpose desired, as shown by the dotted lines in Fig. 3, to do which all that is necessary is to withdraw the ring or band O from engagement with the tip end of the ear or plate $m$, when the pump and the head can be swung out of position on the pin or pivot $m'$.

The head is attached to the engine by entering the shank of the post N into the frame or standard of the engine, and when attached the tool-driving shaft is entered into the sleeve B, the sleeve being connected therewith by the screw $b^2$.

The pulley C is slipped onto the sleeve B, and the ring E slipped onto the eccentric disk D. The plate F is slipped onto the center or hub $d$ and is attached in place by screws or otherwise so as to unite the plate F with the pulley C and eccentric disk D, and the collar $e$ is slipped onto the end of the sleeve B against the plate F, and is locked to the sleeve by the set-screw $e'$. The stem or rod E is connected with the piston, and the piston inserted in the pump-cylinder, as usual, and the pump-cylinder attached to the arm P, which is pivoted to the post N, completing the assembling of the parts ready for attaching to the dental engine for use.

In use the head of the dental engine is removed and my improved head attached in lieu of the removed head, and a belt (not shown) is placed over the pulley A, if the tool is to be used, and over the pulley C if the pump is to be used, and with either pulley A or C the belt is not changed in respect to its length or otherwise, but simply transferred from one pulley to the other, and such transfer is rapidly performed by reason of the pulleys A and C standing side by side, so that the belt can be slipped from the groove of one pulley into the groove of the other without removing the belt from the driving-wheel of the engine. The head is very simple in construction and can be readily placed on the dental engine, and when in place enables either the tool-shaft or the pump to be operated by one and the same driving-belt, without changing the belt on the engine, and without increasing or decreasing the length of the belt, and this result is had by forming one of the pulleys with a sleeve, which sleeve constitutes the bearing for the other pulley and enables one pulley to run the tool-shaft and the other pulley to operate the pump without changing the belt, and it is evident that the feature of using a shifting belt to operate both a tool-shaft and a pump in a dental engine can be obtained by using the pulley A, with a clutch on one side to engage a clutch on an eccentric, with a spline or key connection for the pulley A, which would lock it with the sleeve B in one position, so as to drive the sleeve B, and which would unlock it from the sleeve B in another position, so as to drive the eccentric without driving the sleeve, and such construction would attain the end of utilizing a single driving-belt in a dental engine for operating both the tool-shaft and the pneumatic pump.

The sleeve B, instead of having the head $b'$ formed therewith, could have such head formed separate as a collar or band, and such collar or band could be secured to the sleeve B by a set-screw similar to the attachment of the collar $e$, and with such construction the sleeve B could be formed with the pulley A and attached to the tool-shaft by the set-screws which attach the collar $e$ and the collar which takes the place of the head $b'$.

What I claim is—

1. The combination with the pulley C, and an eccentric D, forming part of the pulley C, of the ring E having the stem $E'$ and free end $e^2$ and adjusting screw $e^3$ for taking up the wear of the eccentric disk and ring, substantially as specified.

2. The pump cylinder I and plate $l$, in combination with the arm P, ear $m$, post N, and sliding collar O, substantially as and for the purposes specified.

3. The pump cylinder I and plate $l$, in combination with the arm P, ear $m$, post N, sliding collar O, lock nut $o$, and spring $o'$, substantially as and for the purposes specified.

WILLIAM HAHN.

Witnesses:
O. W. BOND,
FRANK W. ROBINSON.